United States Patent [19]

Giese

[11] 4,348,907
[45] Sep. 14, 1982

[54] RETIREMENT ELONGATION INDICATOR FOR MAST RAISING LINES

[76] Inventor: Gene E. Giese, 11121 Springhollow Rd., Suite 111, Oklahoma City, Okla. 73120

[21] Appl. No.: 126,177

[22] Filed: Mar. 3, 1980

[51] Int. Cl.³ .................................................. G01L 5/04
[52] U.S. Cl. .............................. 73/862.39; 33/168 R; 116/DIG. 34
[58] Field of Search ..................... 116/209, DIG. 34; 73/143, 826, 828, 830, 862.39; 33/168 R

[56] References Cited

U.S. PATENT DOCUMENTS 2,071,694  2/1937  Howe .................................... 73/143
3,540,271 11/1970  Hoff ..................................... 73/143

Primary Examiner—Daniel M. Yasich
Attorney, Agent, or Firm—Robert M. Hessin

[57] ABSTRACT

Apparatus for permanent affixure to a drilling mast raising line for indicating the condition of the mast raising line at selected intervals. Monitor sleeves are swaged to the mast raising line at a specified separation distance X when the line is new, and thereafter repeated measurements of the separation distance can be made to determine an approach to the elastic limits of the line whereupon the mast raising line should be retired from service.

8 Claims, 5 Drawing Figures

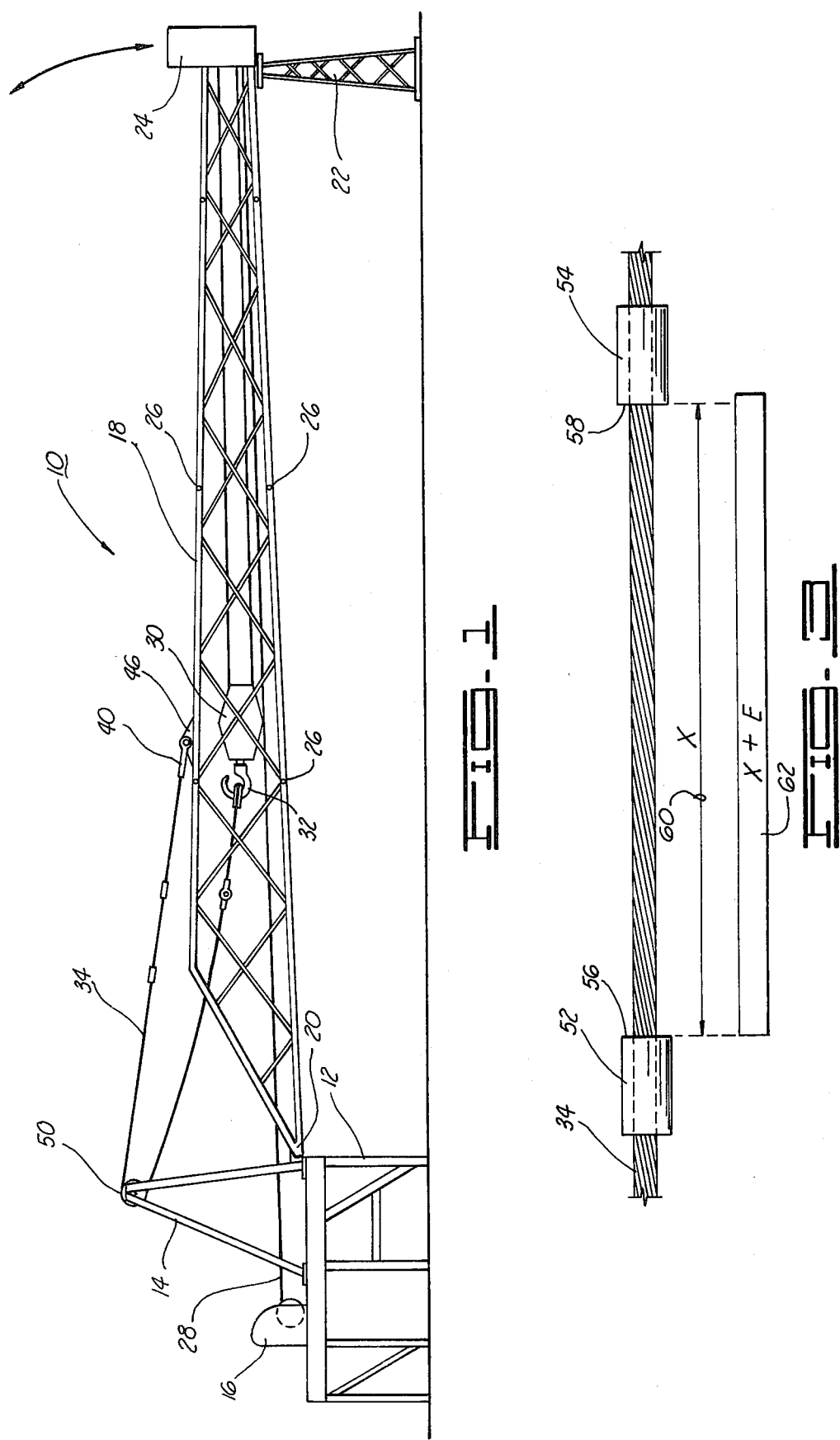

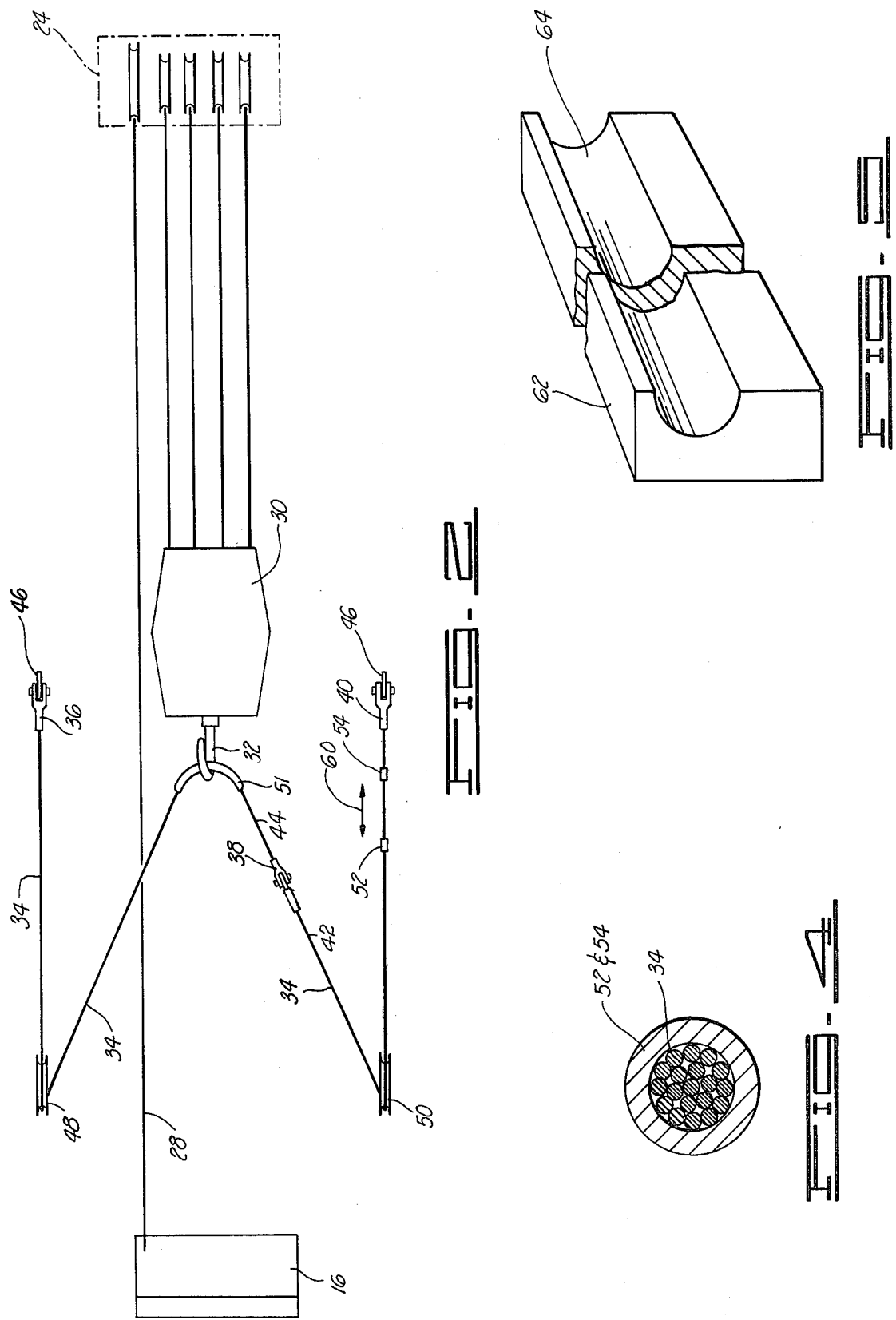

RETIREMENT ELONGATION INDICATOR FOR MAST RAISING LINES

BACKGROUND OF THE INVENTION

1. Field of the Invention

The invention relates generally to a cable reliability indicator and, more particularly, but not by way of limitation, it relates to a monitor device for installation on an oil well drilling mast raising line.

2. Description of the Prior Art

While the basic principle of indicating wear and condition or wire rope by measure of stretch has been known in the prior art, no prior art was discovered which relates to a permanently installed device which could be reliably carried by a cable assembly to indicate the need for retirement of the cable prior to breakage and possible severe damage to associated equipment.

SUMMARY OF THE INVENTION

The present invention relates to a novel form of indicator for permanent installation on an oil well mast raising line that enables continuous monitoring of the mast raising line strength and condition by total elongation to enable timely retirement of the mast raising line prior to breakage and damaging result. The device consists of a pair of monitor sleeves firmly swaged at a preselected spacing on the mast raising line at a non-interfering position, and an associated measuring bar utilized therewith will provide indication of the condition of the mast raising line upon each usage.

Therefore, it is an object of the present invention to provide a mast raising line indicator that enables avoidance of accidental line failure and subsequent destruction to the associated drilling mast and derrick structure.

It is also an object of the invention to provide a line condition indicator of relatively low cost and high reliability.

It is yet another object of the present invention to provide a unitarily formed mast raising line with indicator having standardized performance characteristics.

Finally, it is an object of the invention to provide a safety indicator enabling avoidance of breakage of mast raising lines when the derrick mast is coming off of or laying down onto the derrick stand.

Other objects and advantages will be evident from the following detailed description when read in conjunction with the accompanying drawings which illustrate the invention.

BRIEF DESCRIPTION OF THE DRAWINGS

FIG. 1 is a view in side elevation of oil well drilling derrick structure in the layed down position;

FIG. 2 is a top view schematic of derrick structure rigging of FIG. 1;

FIG. 3 is an enlarged view of a portion of the mast raising line with monitor sleeves affixed;

FIG. 4 is a view in section taken through a monitor sleeve; and

FIG. 5 is a perspective view of a preferred form of measuring bar.

DETAILED DESCRIPTION OF THE INVENTION

Referring to FIG. 1, an oil drilling rig 10 is shown in its layed down position in readiness for mast raising into the operational position. The rig 10 consists of the substructure 12 supporting a pair of A legs 14 on each side thereof and having the draw works 16 centrally mounted as between A legs 14. The drilling mast 18, in this case shown as a centilever-type mast, has its lower frame ends 20 pin mounted at the forward base of each of A legs 14. A derrick stand 22 supports the layed down upper end of mast 18 adjacent the mast crown structure 24 to support the rig 10 in readiness for raising.

The various portions of rig 10 are portable and mobilly delivered to a drilling site for subsequent assembly into the mast raising position. Depending upon the height of mast 18, the length of the mast 18 is made up of serially connected sections which are initially secured by such as mast pins 26, and the drilling line rigging is initially assembled in the layed down position. Thus, a drilling line 28 from draw works 16 is rigged through the crown structure 24 and its plurality of blocks in interconnection with a travelling block 30 and associated hook 32. Using the power of the rig draw works 16, the drilling line 28 in association with traveling block and hook 32 are utilized to erect the derrick mast 18 into its upright or operational position whereupon it is pin secured with necessary safety precaution and support structure to enable function in the upright position. A bridle line or mast raising line 34 is utilized in coaction with the powered traveling block 30 to effect raising of mast 18.

Referring also to FIG. 2, a top view schematic diagram of the rigging, the mast raising line 34 consists of a first wire rope open socket 36 as secured to cable or wire rope 34 having a generally mid-point screw connector assembly 38 and terminating in an open socket 40. As an example, a standard mast raising line for a 131 foot derrick consists of an A section 42 of 108 feet and a B section 44 of 112 feet, the sections being secured together by a pin connector 38. However, it should be understood that mast raising lines in general will range in diameter from 1⅛ inches to 3½ inches and they can be assembled from either 1 part, 2 parts, 3 parts or 4 parts, this usually depending upon the size and the particular mast design.

Referring also to FIG. 1, the respective end open sockets 36 and 40 are securely affixed to respective mast anchor point brackets 46 located on each side of mast 18 and the respective ends of mast line 34 are then led over the respective sheaves 48 and 50 as rotatably supported on top of each A leg 14 with return of the mid portion of mast raising line 34 over a hook thimble 51 as secured over the traveling block hook 32.

Also included on the mast raising line 34 are a pair of monitor sleeves 52 and 54 swaged onto the mast raising line and having their opposed faces separated by a predetermined measure as shown by arrow 60. FIGS. 3 and 4 illustrate the monitor section of mast raising line 34 in greater detail. Thus, the monitor sleeves 52 and 54 are sleeves formed of high carbon steel and having their opposed faces 56 and 58 precisely machined so that sleeves 52 and 54 may be swaged onto the mast raising line 34 with faces 56 and 58 spaced exactly at a predetermined X measure 60. The sleeves 52–54 are placed on the mast raising line 34, preferably, about six feet from an open socket 36 or 40 so that wire rope travel will not bring the sleeves into contact with A-leg sheaves 48 or 50 during the arc of the mast excursion. Thereafter, a measuring bar 62 of calculated length X+E, longer than dimension 60, serves as the elongation indicator, i.e. when measuring bar 62 can be inserted between the opposed monitor sleeve faces 56 and 58, the mast raising line 34 is ready for retirement, as will be further described.

FIG. 5 illustrates a preferred form of measuring bar 62 which includes a unique shape of rectangular cross-section with a semicircular longitudinal groove for receiving the wire rope therein during measurement. The novel shape is preferred to avoid the possibility that rig workers might confuse the measuring bar with other nearby scrap and deface or mar the measuring bar 62, i.e. use it as a pry bar or the like. The measuring bar 62 is preferably formed from direct hardening plate steel having 0.40/0.50 carbon, a high carbon steel of alloy quality. In like manner, the monitor sleeves 52 and 54 are formed from high carbon steel which will maintain accurate swaged positioning on wire rope line 34 and a precise machined measuring face 56 and/or 58.

As shown in FIG. 3, the monitor sleeves 52 and 54 are swaged onto the raising line 34 with gauge faces separated by distance X, designated arrow 60, and it can be pre-calculated as to what amount of permanent elongation E within cable section X will signify an approach to the breakage danger point for the particular mast raising line 34. Thus, when the measuring bar 62 of length X+E is slidable between the machine end faces 56 and 58 when the cable is unstressed, the cable should be retired from a mast raising service.

Mast raising lines today are formed from EIP steel cable, i.e. Extra Improved Plow steel as standardized by the National Bureau of Standards and A.I.S.I., and the manufacturer or supplier of the wire rope utilized in forming the mast raising lines supplies specifications relating to the elastic limit or permanent elongation E of the cable that indicates approach to its breaking strength. These specifications can be employed in forming the measuring bar 62 to the proper permanent elongation limit dimension. The present invention has adopted a standard new cable spacing X of 36 inches, i.e. as between machine faces 56 and 58 of monitor sleeves 52 and 54; however, the distance is arbitrary so long as proper elongation proportion E can be measured.

In operation, in either picking up or laying down the derrick mast 18, the mast raising line 34 is utilized. As shown in FIGS. 1 and 2, the line 34 (section 44) is secured at open-end socket 36 to a mast couple or anchor bracket 46 whereupon it is led over A-leg sheave 48 and back around hook thimble 51. The remaining portion or section 42 of mast raising line 34 is anchored to the mast 18 by open socket 40 at its respective anchor bracket 46 and then led around the opposite A-leg sheave 50 for securing to line section 44 at connector assembly 38.

When the mast raising line 34 is hooked up, and made taut by draw works 16, the measuring bar 62 can be placed at measuring sleeves 52-54 to assure that the permanent elongation limit (X+E) has not been reached. If not, the draw works 16 then continues to reel in drilling line 28 thereby to raise the derrick mast 18 into upright, operative position. The opposite is performed in laying down the derrick mast 18 as draw works 16 pays out drilling line 28 to lower the mast for support on the derrick stand 22. After laying down, and with the line relaxed, the measuring bar 62 should again test for insertion between faces of monitor sleeves 52-54. If, in fact, bar 62 inserts, then retirement of the mast raising line 34 is indicated and failure to replace the line might result in an operational failure causing great damage to the derrick structure and possible physical harm to the operators.

The foregoing teaches a novel form of permanently installed safety indicator for derrick mast raising lines which enables distribution of tested, new mast raising lines already equipped with the standardized safety indicator. Use of the present invention should contribute to greater safety margins in the oil field as sudden breaks of the mast raising lines during the extremely high stress operations will be avoided due to the effective forecasting of the elastic limit and a possible overload. The elastic limit is calculable as:

ELONGATION (ft.) =

$$\frac{\text{TENION(lbs.)} \times \text{LENGTH(ft.) UNDER LOAD}}{\text{METALLIC AREA(sq. in.)} \times \text{MODULUS OF ELASTICITY}}$$

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Apparatus for use in raising or lowering a derrick drilling mast on a substructure including A-leg sheaves and a drawworks extending a drilling line to the travelling hook, comprising:
   a mast raising line connected to move the derrick arcuately in response to a corresponding movement of a drilling line by the drawworks;
   first and second sleeves secured on said cable at a preselected distance X in separation; and
   measuring bar means for periodically measuring between said first and second sleeves when said mast raising line is unstressed to detect a permanent elongation distance X plus E of said mast raising line, where E is approximately 70 percent of the specified elongation limit per unit length X and Elongation Limit=(Tension·Length X)÷(Metallic Area·Modulus of Elasticity).

2. Apparatus as set forth in claim 1 wherein said means for periodically measuring comprises:
   said measuring bar means having a length equal to said preselected distance X plus a preset elongation factor E related to said mast raising line.

3. Apparatus as set forth in claim 1 wherein said first and second sleeves each comprise:
   carbon steel cylinders having an axial bore and smooth opposed end surfaces, each being swaged around said mast raising line at their pre-designated positions.

4. Apparatus as set forth in claim 1 wherein:
   said preselected distance is selected at three feet.

5. Apparatus as set forth in claim 1 wherein said mast raising line comprises:
   a first line section affixed to said derrick and extending over an A-leg sheave for return around said traveling hook; and
   a second line section affixed to said derrick and extending over another A-leg sheave for return and secure connection to said first line section.

6. Apparatus as set forth in claim 5 wherein:
   said first and second sleeves are swaged onto the mast raising line at a position approximately six feet from a derrick affixure to avoid any contact with the associated A-leg sheave during the arcuate movement of the derrick.

7. A method for insuring against breakage of a mast raising line during raising or lowering of a drilling rig derrick mast, comprising:
- bringing the mast raising line to a taut but non-stressed attitude; and
- periodically measuring a preselected portion of said mast raising line, as defined by two spaced apart sleeves that have a length X when new and prior to any operation, with a measuring bar having predetermined length, to determine if the preselected portion has attained a length X plus E indicative of retirement of said line from mast raising service where E is the elongation limit factor per unit length for the mast raising line and
- Elongation Limit = (Tension × Length X) ÷ (Metallic Area × Modulus of Elasticity).

8. The method of claim 7 wherein:
said step of measuring is effected at each drilling mast pick up and lay down operation.

* * * * *